(12) United States Patent
Romero Zaldivar et al.

(10) Patent No.: US 10,802,855 B2
(45) Date of Patent: Oct. 13, 2020

(54) PRODUCING AN INTERNAL REPRESENTATION OF A TYPE BASED ON THE TYPE'S SOURCE REPRESENTATION

(71) Applicant: Oracle International Corporation, Redwood Shores, CA (US)

(72) Inventors: Vicente A. Romero Zaldivar, Miami, FL (US); Maurizio Cimadamore, Donabate (IE); Jonathan J. Gibbons, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/469,176

(22) Filed: Mar. 24, 2017

(65) Prior Publication Data

US 2018/0081648 A1  Mar. 22, 2018

Related U.S. Application Data

(60) Provisional application No. 62/395,826, filed on Sep. 16, 2016.

(51) Int. Cl.
*G06F 9/455* (2018.01)
*G06F 9/445* (2018.01)
*G06F 8/41* (2018.01)

(52) U.S. Cl.
CPC ............ *G06F 9/4552* (2013.01); *G06F 8/433* (2013.01); *G06F 8/437* (2013.01); *G06F 9/44521* (2013.01)

(58) Field of Classification Search
CPC .................................. G06F 8/44; G06F 9/4552
USPC .......................................................... 717/146
See application file for complete search history.

(56) References Cited

U.S. PATENT DOCUMENTS

| | | | | |
|---|---|---|---|---|
| 6,131,188 A | * | 10/2000 | Goebel | G06F 8/443 712/228 |
| 8,526,743 B1 | * | 9/2013 | Campbell | G06K 9/6202 382/181 |
| 9,690,709 B2 | | 6/2017 | Sandoz et al. | |
| 2003/0023956 A1 | * | 1/2003 | Dulberg | G06F 11/3624 717/130 |
| 2003/0023961 A1 | * | 1/2003 | Barsness | G06F 8/443 717/152 |
| 2005/0015748 A1 | * | 1/2005 | Zatloukal | G06F 8/20 717/114 |

(Continued)

*Primary Examiner* — Chat C Do
*Assistant Examiner* — Bradford F Wheaton
(74) *Attorney, Agent, or Firm* — Invoke

(57) ABSTRACT

Operations include determining a compile-time representation of a particular type. A request for the compile-time representation of the particular type comprises a source representation of the particular type. Based on and subsequent to receiving the request, a source representation of a source code file comprising the source representation of the particular type is generated. The source representation of the source code file is converted to a compile-time representation of the source code file. The compile-time representation of the particular type is derived from the source time representation of the source code file. The source code file may also be compiled to generate a set of compiled code. The set of compiled code may be loaded into a virtual machine for generating a runtime representation of the set of compiled code. A runtime representation of the particular type is derived from the runtime representation of the set of compiled code.

21 Claims, 8 Drawing Sheets

(56) References Cited

U.S. PATENT DOCUMENTS

| | | | |
|---|---|---|---|
| 2005/0240897 A1* | 10/2005 | Kailas | G06F 8/52 717/100 |
| 2007/0094673 A1* | 4/2007 | Hunt | G06F 9/4411 719/321 |
| 2010/0146014 A1* | 6/2010 | Ionescu | G06Q 10/06 707/810 |
| 2012/0005660 A1* | 1/2012 | Goetz | G06F 8/437 717/140 |
| 2016/0188352 A1* | 6/2016 | Marathe | G06F 8/41 717/145 |
| 2017/0039043 A1 | 2/2017 | Haupt et al. | |
| 2017/0286065 A1 | 10/2017 | Zhou et al. | |
| 2018/0032347 A1 | 2/2018 | Haupt et al. | |
| 2018/0032355 A1 | 2/2018 | Haupt et al. | |
| 2018/0349116 A1* | 12/2018 | Lee | G06F 9/44 |

* cited by examiner

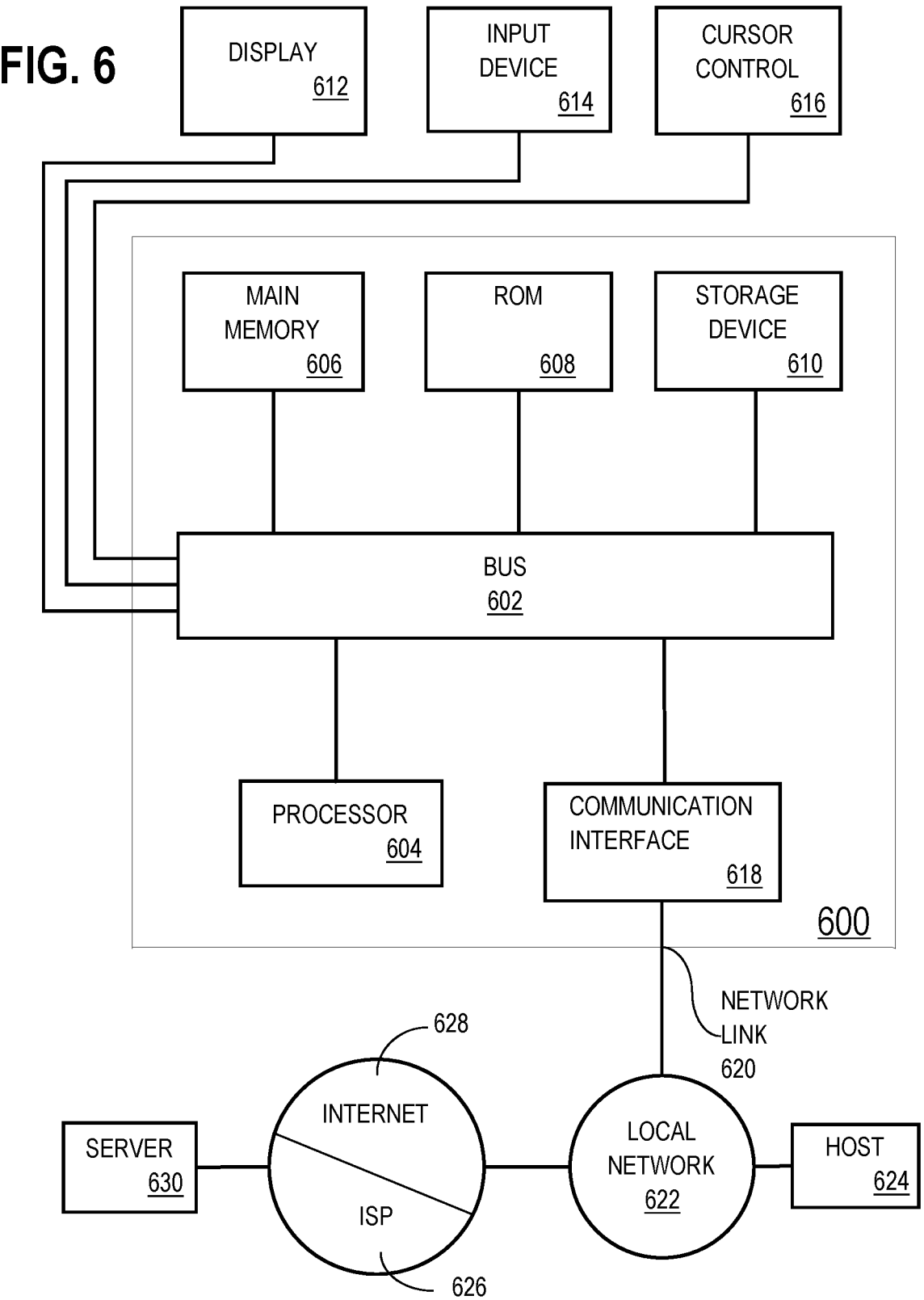

PRODUCING AN INTERNAL REPRESENTATION OF A TYPE BASED ON THE TYPE'S SOURCE REPRESENTATION

BENEFIT CLAIM; INCORPORATION BY REFERENCE

This application claims benefit of U.S. Provisional Patent Application 62/395,826 filed on Sep. 16, 2016, the entire contents of which are hereby incorporated by reference.

TECHNICAL FIELD

The present disclosure relates to producing a compiler's internal representation (compile-time representation) of a type based on the type's source representation. The present disclosure further relates to producing a runtime representation of a type based on the type's source representation.

BACKGROUND

A compiler converts source code, which is written according to a specification directed to the convenience of the programmer, to a compile-time representation of the source code. The compile-time representation may be used during the compilation process.

The compile-time representation may be converted to either (a) machine or object code, which is executable directly by the particular machine environment, or (b) an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code.

Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 illustrates a system in accordance with one or more embodiments.

DETAILED DESCRIPTION

Figure 1:
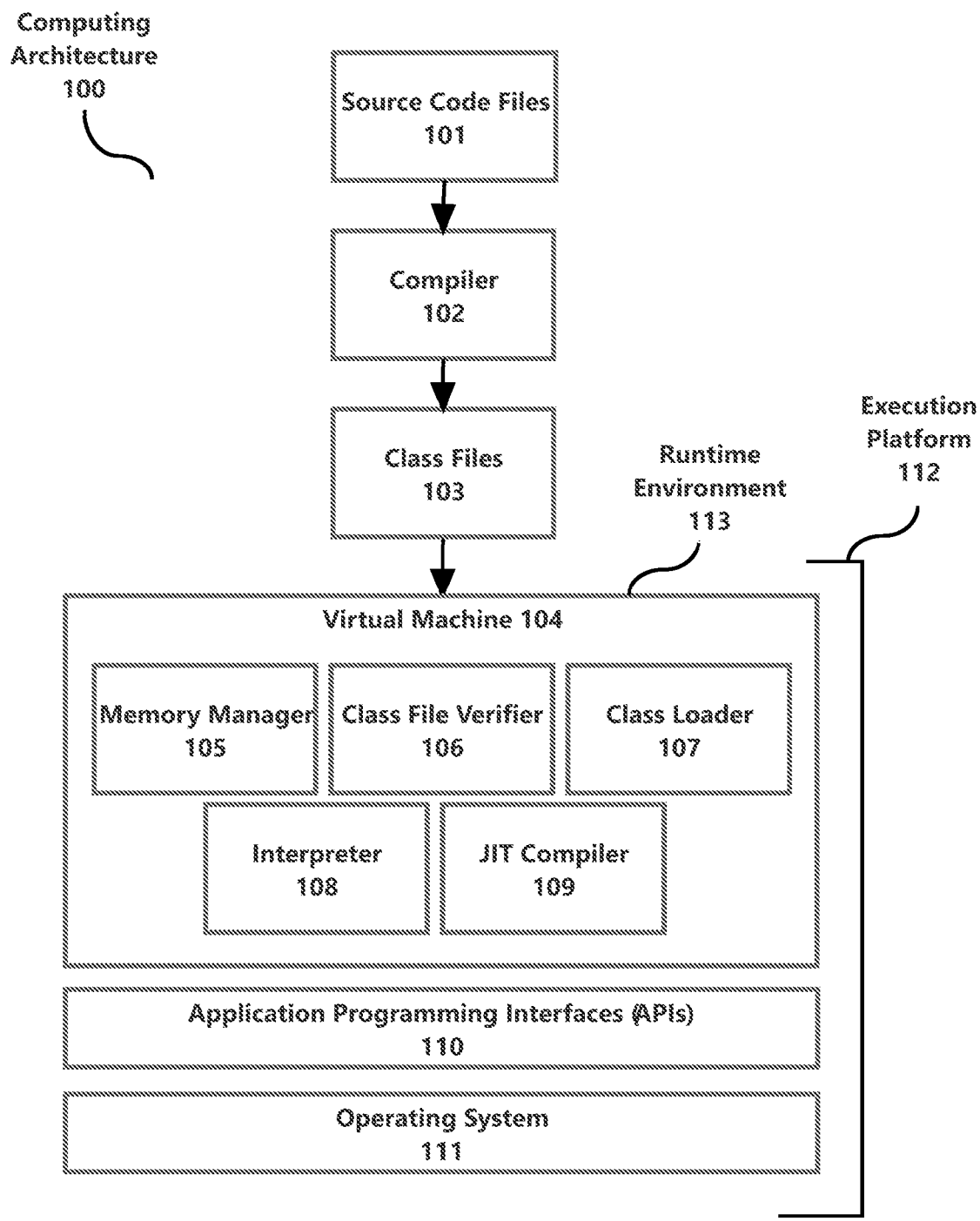
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. GENERATING A COMPILE-TIME REPRESENTATION OF A TYPE FROM A SOURCE REPRESENTATION OF THE TYPE
4. GENERATING A RUNTIME REPRESENTATION OF A TYPE FROM A SOURCE REPRESENTATION OF THE TYPE
5. MISCELLANEOUS; EXTENSIONS
6. HARDWARE OVERVIEW

1. General Overview

Embodiments relate to generating a compile-time representation of a particular type based on a source representation of that particular type. A source code file, including the source representation of the particular type, is generated in response to and subsequent to receiving the request for the compile-time representation of the particular type. The source code file defines a programming language construct which may be unbeknownst to the entity which requested the compile-time representation of the particular type. The programming language construct includes a field corresponding to the particular type. The source representation of the source code file is converted to a compile-time representation of the source code file. The source representation of the source code file may be converted to a compile-time representation of the source code file by a compiler during a compilation process. The compile-time representation of the particular type is derived from the compile-time representation of the source code file. The compile-time representation of the particular type is displayed and/or stored.

Embodiments relate to generating a runtime representation of a particular type based on a source representation of the particular type. A source code file, including the source representation of the particular type, is generated in response to and subsequent to receiving the request for the runtime representation of the particular file. The source code file defines a programming language construct which may be unbeknownst to the entity which requested the compile-time representation of the particular type. The programming language construct includes a field corresponding to the particular type. The source code file is compiled to generate a set of compiled code. The set of compiled code may correspond to, for example, a class file. The set of compiled code is loaded into a virtual machine to obtain a runtime representation of the compiled code including a runtime representation of the particular type. The runtime representation of the particular type is derived from the virtual machine of the runtime environment. The runtime representation of the particular type is displayed and/or stored.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 112 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C #, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as JavaScript) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpass a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 111. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
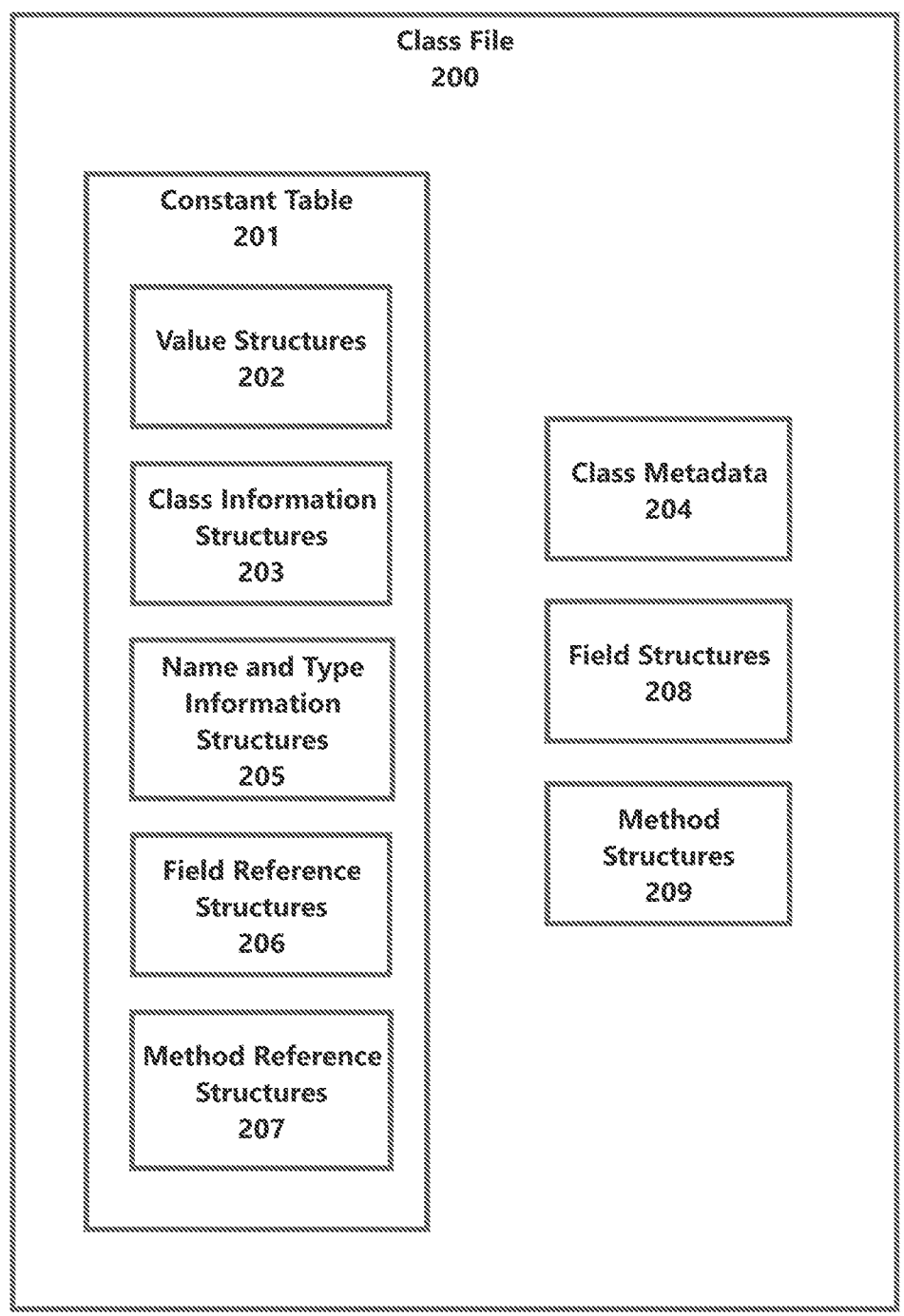
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" corresponds to a particular array where each entry in the particular array references a respective nested array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor})ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(IDLThread;)LObject;".

In an embodiment, the virtual machine instructions held in the method structures 209 include operations which reference entries of the constant table 201. Using Java as an example, consider the following class:

---
class A
---
{
int add12and13( ) {
    return B.addTwo(12, 13);
    }
}
---

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 112. As will be described in Section 2.3, eventually the run-time representation of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
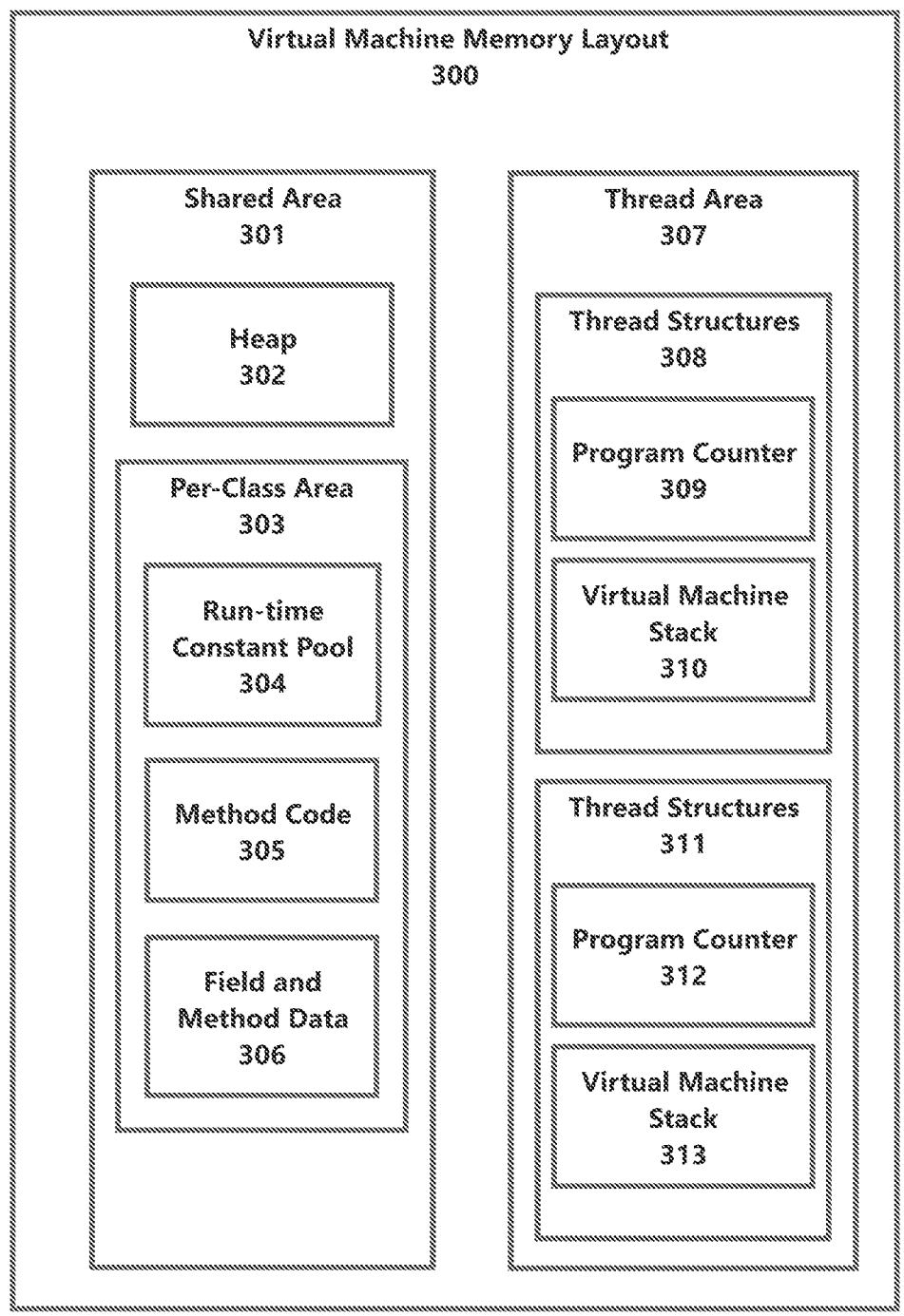
FIG. 3 illustrates an example virtual machine memory layout in block diagram form according to one or more embodiments.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
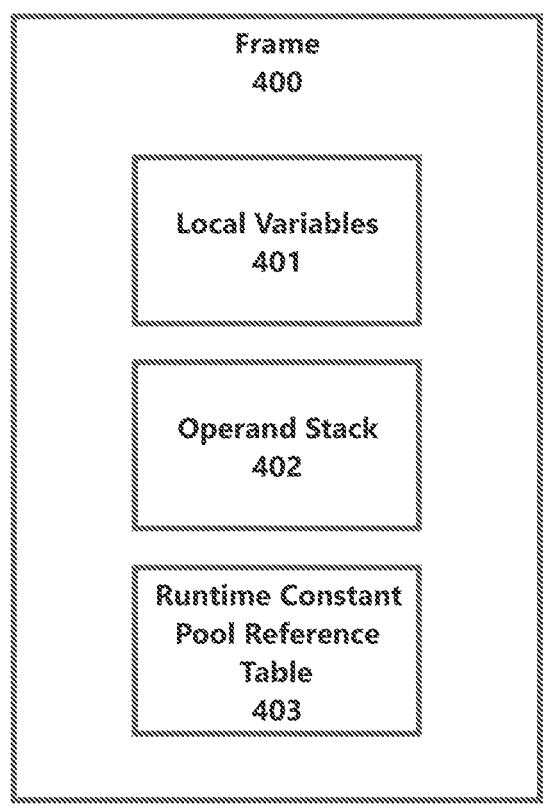
FIG. 4 illustrates an example frame in block diagram form according to one or more embodiments.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 501 onto the operand stack 502. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 112. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the superclasses of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

Figure 5A:
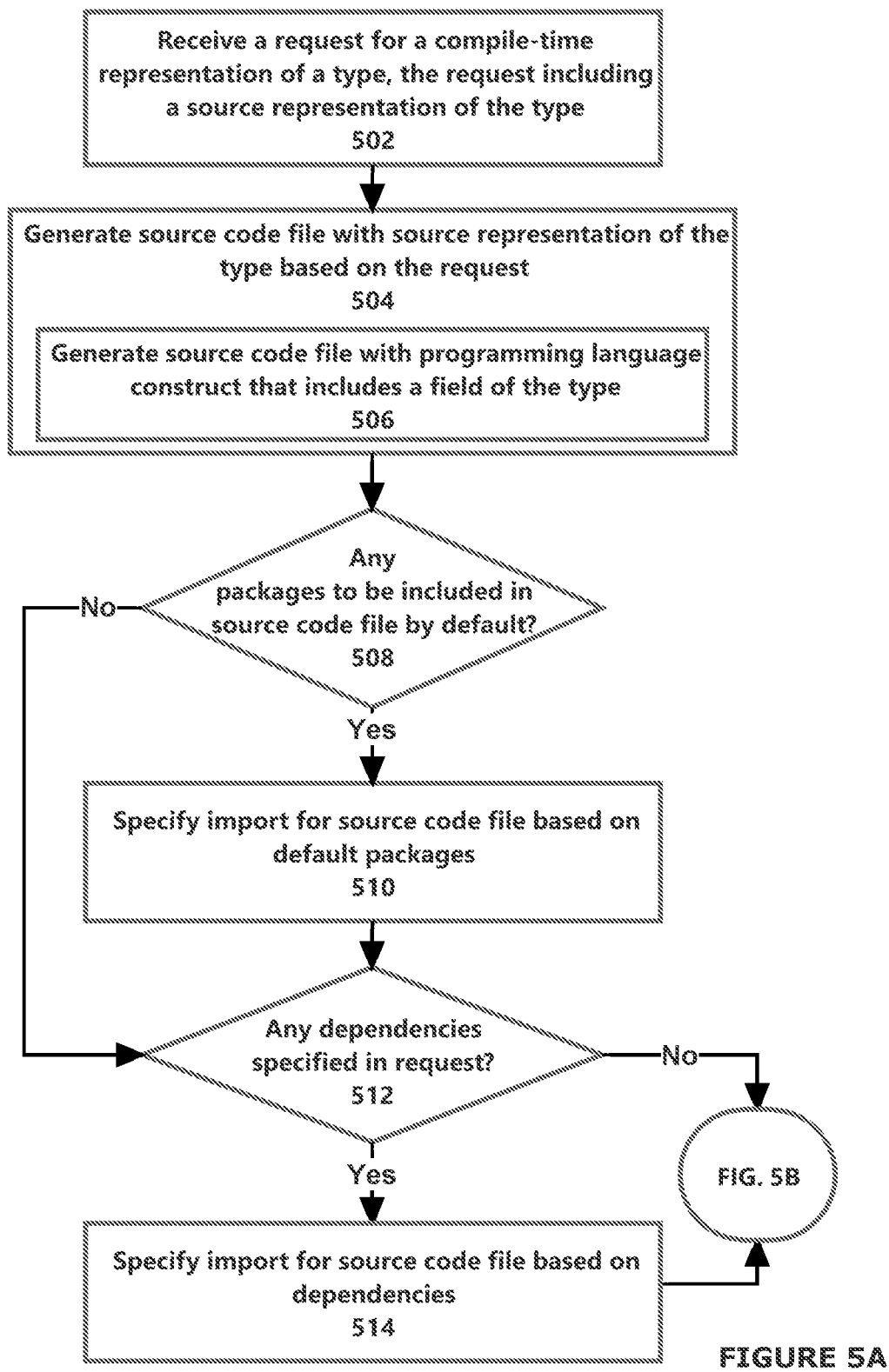
FIGS. 5A-5C illustrate operations for obtaining a compile-time representation and/or a runtime representation of a particular type in accordance with one or more embodiments.
Figure 5B:
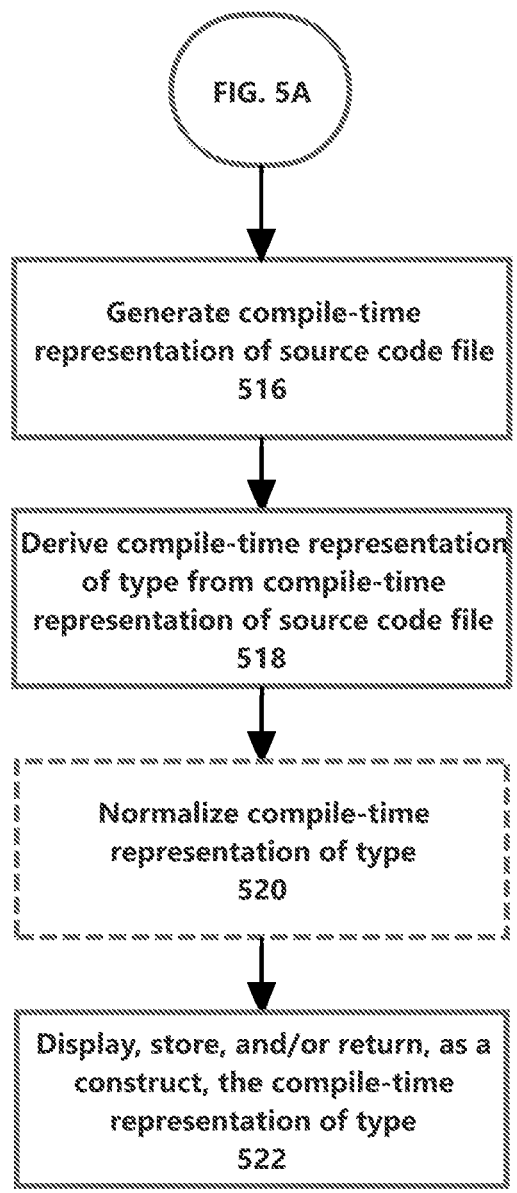
Figure 5C:
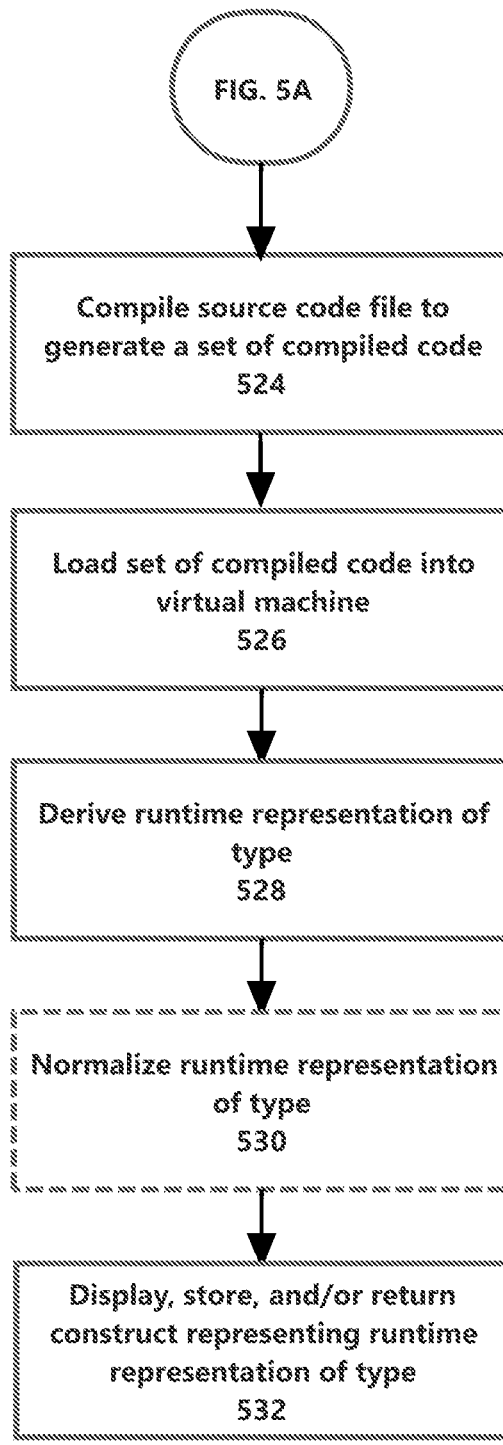

3. Generating a Compile-Time Representation of a Type from a Source Representation of the Type FIGS. 5A-5C illustrate an example set of operations for generating a compile-type representation of a type from a source representation of the type, in accordance with one or more embodiments. One or more operations illustrated in FIG. 5A-5C may be modified, rearranged, or omitted all together. Accordingly, the particular sequence of operations illustrated in FIGS. 5A-5C should not be construed as limiting the scope of one or more embodiments.

Initially, a request is received for a compile-time representation of a particular type (Operation 502). The request may identify the particular type via a source representation of the particular type. The source representation may be specified, for example, by a user, a code analysis program, and/or a code testing program. A source representation is a representation of the particular type specified using a general-purpose computer programming language (e.g., Java, C++, or C). Examples of source representations of primitive types include but are not limited to byte, short, int, long, float, double, char, and boolean. Examples of non-primitive types include developer-defined and/or library-defined classes (e.g., Foo, MyClass, etc.), Interfaces (e.g., java.util.List, BobsInterface, etc.), and Arrays. The particular type, for which a compile-time representation is requested, may be a type which includes multiple other types. The particular type may be, for example, a list of list of integers.

The requested compile-time representation of the particular type is a representation of the particular type that may be determined by a compiler based on the source representation of the particular type. The requested compile-time representation may be used by a compiler during a compilation process. The compile-time representation may further be converted to bytecode which is submitted as input to a virtual machine. Accordingly, the compile-time representation may be different than the bytecode which is submitted as input to the virtual machine. A compile-time representation of a non-primitive type, such as a class with multiple fields and/or methods, may be based at least in part on the respective source representations of the fields and/or methods.

In addition to the source representation of the particular type, the request of Operation 502 may include dependencies corresponding to the particular type. For example, the request may identify dependencies on a package which defines the particular type or on multiple packages which together define the particular type, any other types within the particular type, any types used in the definition of the particular type, and/or used to define the particular type. The packages which define the particular type may be necessary for use in a process for determining the compile-time representation of the particular type, as described herein. In some embodiments, dependencies may not be included with the request. Accordingly, embodiments described herein include both requests which specify dependencies and requests which do not specify dependencies.

In an embodiment, the request for the compile-time representation of a particular type may correspond to the invocation of a method which returns the compile-time representation of the particular type. Specifically, the request may be received by the invocation of a method (e.g., getType( ) or getCompileTimeType( )) defined by a particular Application Programming Interface (API). The method may accept, as a parameter, a String which lists the source representation of the particular type. For example, the String "Integer" or the String "List<List<Integer>>" may be submitted as an argument for the method invocation. Invoking the method may first require instantiating a class, which includes the method, to obtain an object of the class. Once the object is obtained, the method may be invoked via the object.

In an embodiment, the request for the compile-time representation of a particular type may be submitted via a Command Line Interface (CLI) or a Graphical User Interface (GUI). A user may type in "List<List<Integer>>" which corresponds to a source representation of a list of list of integers. The input is accepted by a program which determines and returns the compile-time representation corresponding to the source representation List<List<Integer>>.

Continuing with FIG. 5A, one or more embodiments include generating a source code file with the source representation of the particular type in response to and subsequent to receiving the request (Operation 504). Generating a source code file, subsequent to receiving the request, may include creating an entirely new source code file that includes the source representation of the particular type or adding the source representation of the particular type to an existing source code file.

In an embodiment, generating a source code file includes generating the source code file with a programming language construct which includes a field of the particular type (Operation 506). The programming language construct may be a wrapper declaration or wrapper class which serves as a container for a field of the particular type. The programming language construct may not necessarily be requested by the requestor of the compile-time representation of the particular type. The requestor may not necessarily even be aware of the creation of the programming language construct as a container for a field of the particular type. In an example, the particular type may be a list of list of integers (as described above), and the programming language construct may be a class which declares the list of list of integers. The programming language construct may not necessarily include any fields other than the field of the particular type for which the compile-time representation has been requested. If the compile-time representation has been requested for multiple different types, then the programming language construct may include a field corresponding to each of the multiple different types. The programming language construct may be declared with a variable name. Furthermore, the field within the programming language construct, corresponding to the particular type, may also be declared with a variable name. The existence of the programming language construct and/or the variable name of the programming language construct may be unbeknownst to the entity which requested the compile-time representation of the particular type. Furthermore, the variable name of the field corresponding to the particular type may also be unbeknownst to the entity which requested the compile-time representation of the particular type.

As an example, a request is received from a code testing framework for a compile-time representation of a list of list of integers. Based on the request, a source code file is generated with a class MyClass which has a field Var_Name_1 of type list of list of integers. The program, which receives the request and performs at least some of the operations described herein, selects both the variable names MyClass and Var_Name_1 unbeknownst to the code testing framework. The class MyClass may be created for the purpose of determining the compile-time representation of a list of list of integers.

In an embodiment, the programming language construct may be a lowest level programming language construct that is accepted as input by a compiler. The particular type (e.g., list of list of integers) may not necessarily be acceptable as input by itself by a compiler. A class, with a field corresponding to the particular type, may be the lowest level programming language construct that is accepted as input by the compiler.

In an example, a compile-time representation (or runtime representation) of List<String> is requested. A source code file which includes List<String> is generated. The source code file may include, for example, any of:

```
a. class SyntheticClass1 {
        List<String> syntheticField;
   }
b. interface SyntheticClass2 {
        List<String> syntheticMethod( );
   }
c. interface SyntheticClass3 {
        void syntheticMethod(List<String> l);
   }
d. interface SyntheticClass4 extends List<String> { }
e. class SyntheticClass5 {
        void main( ) {
            List<String> ls = ...
        }
   }
```

In an embodiment, the particular type (for which a compile-time representation is being requested) may be incorporated in any manner into the source code file that is being constructed. The source code may be constructed to define any of:
 a. a programming language construct comprising a field of the particular type;
 b. a method with (a) an argument of the particular type or (b) a return type of the particular type;
 c. a first programming language construct that extends a second programming language construct of the particular type; or
 d. a programming language construct comprising an array of the particular type.

In an embodiment, the source code may be constructed to define a programming language construct comprising (1) a type-variable of the particular type and (2) a set of one or more bounds for the type-variable. As an example, the source code file may be constructed to define a Fake class with a corresponding set of bounds: class Fake<X extends String> { }.

In an embodiment, a determination is made as to whether any packages are to be included in the source code file by default (Operation 508). If packages are to be included by default, then importing of the packages may be specified in relation to the source code file (Operation 510). A program which receives the request of Operation 502 may generate a source code file with import statements to import packages that define commonly used types. As an example, java.util and java.lang may be default packages to be imported. A programming language construct such as a class, which includes a field of the particular type for which a compile-time representation is requested, may be configured to import java.util and java.lang by default for all requests for compile-time representations of any type.

Instead of or in addition to packages that are imported by default, packages may be imported based on any dependencies specified in the request of Operation 502. Specifically, if there are any dependencies identified in the request (Operation 512), then packages corresponding to those dependencies are identified. The identified packages may then be imported (Operation 514). Some implementations may further require ensuring any necessary permissions are granted for the importing of the packages.

Operations 502-514 described in FIG. 5A may be followed by operations described in FIG. 5B and/or operations described in FIG. 5C.

Continuing now to FIG. 5B, a compile-time representation of the source code file is generated in accordance with one or more embodiments (Operation 516). The compile-time representation of the source code file may be generated, by a compiler, from the source representation of the source code file. The compile-time representation may be an internal representation used by the compiler to perform one or more functions that may typically be performed by a compiler during a compilation process. The compile-time representation may be different than the bytecode which is also generated by the compiler as input to a virtual machine.

In an embodiment, the compile-time representation of the particular type is derived from the compile-time representation of the source code file (Operation 518). Compile-time reflection techniques may be used to derive the compile-time representation of the particular type from the compile-time representation of the source code file. The compile-time representation of the particular type may be returned as a construct that may be examined and/or manipulated by a program such as a code testing framework or a code analysis framework.

In an embodiment, each conversion of the source representation of the source code file to the compile-time representation of the source code file may result in a variation in the resulting compile-time representation. For example, a time stamp or other value may be incorporated into the compile-time representation of the source code file. Furthermore, the compile-time representation of the particular type may vary from compilation to compilation. In an embodiment, a normalization operation is executed to map the different compile-time representations of the particular type to a same value (Operation 520). The normalization ensures that the same compile-time representation of the particular type may be determined for different requests of the compile-time representation of the particular type.

In an embodiment, the compile-time representation of the particular type (which may be normalized) is displayed, stored, and/or returned as a construct that can be manipulated/examined (Operation 522). The compile-time representation may be stored as an object, a string, an array, a tree, or any other data structure, and the data in the compile-time representation may be mapped to the corresponding components of the structure in which it is stored. The compile-type representation of the particular type may be displayed and/or stored separately from any other portion of the set of compiled code generated from compiling the source code file. The compile-time representation of the particular type may be returned as a construct by the method which was invoked to obtain the compile-time representation of the particular type. The construct, corresponding to the compile-time representation of the particular type, may then be examined and/or manipulated. The compile-time representation of the particular type may be displayed by the GUI or CLI which initially received the request for the compile-time representation of the particular type.

Referring the above example, the source code file is generated with a class MyClass which has a field Var_Name_1 of type list of list of integers. The source representation of the source code file is converted to a compile-time representation of the class MyClass and a compile-time representation of field Var_Name_1. The compile-time representation of the type list of list of integers, corresponding to the field Var_Name_1, is derived such that the derived compile-time representation is independent of and does not represent the class MyClass.

As noted above, in at least one embodiment, compile-time representations of multiple types may have been requested. Conversion of the source code file with multiple source representations corresponding respectively to the multiple types results in a set of compile-time code which includes multiple compile-time representations of the multiple types. The multiple compile-time representations may be individually derived for display, storage, and/or return to a requesting entity. Each compile-time representation may be displayed in association with a corresponding source representation of the respective type.

4. Generating a Runtime Representation of a Type from a Source Representation of the Type One or more embodiments include generating a runtime representation of a type from a source representation of the type as illustrated in FIGS. 5A and 5C when considered in combination. Operation 502 of FIG. 5A may instead and/or in addition, request a runtime representation of a type (request for runtime representation is not illustrated). Requesting a runtime representation of the particular type may be similar to requesting a compile-time representation of the particular type. For example, method invocation, CLIs, and/or GUIs as described above may be used for submitting the request for a runtime representation of the particular type. In order to determine the runtime representation of the particular type, a source code file including a source representation of the type and a set of import statements may be generated as described above with reference to Operations 504-514.

In an embodiment, the source code file may be compiled using a compiler to generate a set of compiled code (Operation 524). The set of compiled code, as referred to herein, corresponds to bytecode that may be loaded into a virtual machine. The compiler may be implemented separately within the program that generated the source code file with the source representation of the particular type. If implemented separately, the source code file is submitted to the compiler for compilation and a set of compiled code is received from the compiler.

In an embodiment, the set of compiled code is loaded into a virtual machine of a runtime environment (Operation 526). Loading the set of compiled code (e.g., a class file) into a virtual machine is described above in Section 2. Once the set of compiled code is loaded into the virtual machine, the runtime representation of the particular type is derived from the virtual machine (Operation 528). The runtime representation of the particular type may be derived using runtime reflection techniques. As an example, a class file attribute (sigma attribute) stores a runtime representation of a field of the class. The class file attribute is analyzed to determine the runtime representation of the field corresponding to the particular type.

The runtime representation of the particular type may be normalized (Operation 530). In an embodiment, the normalization operation is executed to map different runtime representations of the particular type to a same value. The normalization ensures that the same runtime representation of the particular type may be determined for different requests of the runtime representation of the particular type.

In an embodiment, the runtime representation of the particular type (which may be normalized) is displayed, stored, and/or returned as a construct that may be examined or manipulated (Operation 532). The runtime representation of the particular type may be returned by the method which was invoked to obtain the runtime representation of the particular type. The runtime representation of the particular type may be displayed by the GUI or CLI which initially received the request for the runtime representation of the particular type.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:

receiving a plurality of requests for a compile-time representation of a particular type, the plurality of requests including a first request comprising a source representation of the particular type;

based on and subsequent to receiving the first request, generating a source representation of a source code file comprising the source representation of the particular type that was included in the first request, wherein the source code file defines a programming language construct comprising a field of the particular type and one or more bounds of a type variable of the particular type, wherein the programming language construct was not included in the first request;

converting, using a compiler, the source representation of the source code file to a first compile-time representation of the source code file, wherein the plurality of requests for the compile-time representation of the particular type result in different compile-time representations, including the first compile-time representation, for the particular type;

extracting the first compile-time representation of the particular type from the compile-time representation of the source code file;

normalizing the different compile-time representations, including the first compile-time representation to generate a same normalized compile-time representation of the particular type;

performing at least one of:
storing the same normalized compile-time representation of the particular type separate from the different compile-time representations of the particular type; or
presenting the same normalized compile-time representation of the particular type in response to different requests of the plurality of requests for the compile-time representation of the particular type.

2. The one or more media of claim 1, further storing instructions which, when executed by one or more processors, cause:

specifying a variable name for the particular type in the source code file, wherein the variable name is not defined in the first request.

3. The one or more media of claim 1, wherein the programming language construct is a wrapper declaration.

4. The one or more media of claim 1, further storing instructions which, when executed by one or more processors, cause:

specifying a variable name for the programming language construct, wherein the programming language construct is not defined in the first request, and wherein the variable name is not defined in the first request.

5. The one or more media of claim 1, wherein the programming language construct is a class.

6. The one or more media of claim 5, wherein the field of the particular type is the only field of the class.

7. The one or more media of claim 5, wherein the class imports at least one package by default, the at least one package defining the particular type.

8. The one or more media of claim 5, wherein the class imports at least one package based on a dependency specified in the first request, the at least one package defining the particular type.

9. The one or more media of claim 1, wherein the programming language construct further comprises (a) the type variable of the particular type.

10. The one or more media of claim 1, wherein the source representation of the particular type is received as a String value.

11. The one or more media of claim 1, further storing instructions which, when executed by one or more processors, cause:
presenting, storing, or returning the compile-time representation of the particular type.

12. The one or more media of claim 1, further storing instructions which, when executed by one or more processors, cause:
presenting, storing, or returning the compile-time representation of the particular type without presenting any other portion of the compile-time representation of the source code file.

13. The one or more media of claim 1, wherein the source code file defines a method with (a) an argument of the particular type or (b) a return type of the particular type.

14. The one or more media of claim 1:
wherein the first request further requests a compile-time representation of a second type, and wherein the first request further comprises a source representation of the second type;
wherein the source code file is generated to further comprise the source representation of the second type;
wherein the compile-time representation of the source code file further comprises a compile-time representation of the second type;
the one or more media further storing instructions which, when executed by one or more processors, cause:
extracting the compile-time representation of the second type from the compile-time representation of the source code file.

15. The one or more media of claim 1, wherein extracting the compile-time representation of the particular type comprises using compile-time reflection techniques on the compile-time representation of the source code file.

16. The one or more media of claim 1, wherein the programming language construct (a) extends a second programming language construct of the particular type or (b) comprises an array of the particular type.

17. The one or more media of claim 1:
wherein the compile-time representation of the source code file is different from the source representation of the source code file;
wherein the compile-time representation of the particular type is different from any source representation of the particular type.

18. One or more non-transitory machine-readable media storing instructions which, when executed by one or more processors, cause:
receiving a plurality of requests for a runtime representation of a particular type, the plurality of requests including a first request comprising a source representation of the particular type;
based on and subsequent to receiving the first request, generating a source representation of a source code file comprising the source representation of the particular type that was included in the fist request, wherein the source code file defines a programming language construct comprising a field of the particular type and one or more bounds of a type variable of the particular type, wherein the programming language construct was not included in the first request;
compiling the source code file to generate a set of compiled code;
loading the set of compiled code into a virtual machine to generate a runtime representation of the set of compiled code, wherein the runtime representation of the set of compiled code comprises a first runtime representation of the particular type, wherein the plurality of requests for the runtime representation of the particular type result in different runtime representations, including the first runtime representation, for the particular type;
extracting the first runtime representation of the particular type from the runtime representation of the set of compiled code;
normalizing the different runtime representations, including the first runtime representation to generate a same normalized runtime representation of the particular type;
performing at least one of:
storing the same normalized runtime representation of the particular type separate from the different runtime representations of the particular type; or
presenting the same normalized runtime representation of the particular type in response to different requests of the plurality of requests for the runtime representation of the particular type.

19. The one or more media of claim 18:
wherein the runtime representation of the set of compiled code is different from the source code file;
wherein the runtime representation of the particular type is different from any source representation of the particular type.

20. A method comprising:
receiving a plurality of requests for a compile-time representation of a particular type, the plurality of requests including a first request comprising a source representation of the particular type;
based on and subsequent to receiving the first request, generating a source representation of a source code file comprising the source representation of the particular type that was included in the first request, wherein the source code file defines a programming language construct comprising a field of the particular type and one or more bounds of a type variable of the particular type, wherein the programming language construct was not included in the first request;
converting, using a compiler, the source representation of the source code file to a first compile-time representation of the source code file, wherein the plurality of requests for the compile-time representation of the particular type result in different compile-time representations, including the first compile-time representation, for the particular type;
extracting the first compile-time representation of the particular type from the compile-time representation of the source code file;

normalizing the different compile-time representations, including the first compile-time representation to generate a same normalized compile-time representation of the particular type;

performing at least one of:

storing the same normalized compile-time representation of the particular type separate from the different compile-time representations of the particular type; or presenting the same normalized compile-time representation of the particular type in response to different requests of the plurality of requests for the compile-time representation of the particular type;

wherein the method is performed by at least one device including a hardware processor.

21. The method of claim 20:

wherein the compile-time representation of the source code file is different from the source representation of the source code file;

wherein the compile-time representation of the particular type is different from any source representation of the particular type.

\* \* \* \* \*

UNITED STATES PATENT AND TRADEMARK OFFICE
CERTIFICATE OF CORRECTION

| | |
|---|---|
| PATENT NO. | : 10,802,855 B2 |
| APPLICATION NO. | : 15/469176 |
| DATED | : October 13, 2020 |
| INVENTOR(S) | : Romero Zaldivar et al. |

Page 1 of 1

It is certified that error appears in the above-identified patent and that said Letters Patent is hereby corrected as shown below:

In the Claims

In Column 26, Line 6, in Claim 18, delete "fist" and insert -- first --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*